United States Patent
Smith et al.

(10) Patent No.: US 6,842,819 B2
(45) Date of Patent: Jan. 11, 2005

(54) AUTOMATIC CORNER CASE SEARCH IN MULTI-AGENT BUS INTERFACE VERIFICATION

(75) Inventors: Brian E. Smith, Dublin, CA (US); Victor Melamed, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 425 days.

(21) Appl. No.: 09/971,214

(22) Filed: Oct. 4, 2001

(65) Prior Publication Data

US 2003/0070030 A1 Apr. 10, 2003

(51) Int. Cl.$^7$ .............................................. G06F 13/00
(52) U.S. Cl. ...................................... 710/309; 703/26
(58) Field of Search ................................ 710/100, 107, 710/305, 309; 703/14, 23, 26; 714/739

(56) References Cited

U.S. PATENT DOCUMENTS

| | | | | |
|---|---|---|---|---|
| 5,966,306 A | * | 10/1999 | Nodine et al. | 700/121 |
| 6,073,199 A | * | 6/2000 | Cohen et al. | 710/113 |
| 6,240,490 B1 | * | 5/2001 | Lyles et al. | 711/141 |
| 6,347,388 B1 | * | 2/2002 | Hollander | 714/739 |

* cited by examiner

Primary Examiner—Glenn A. Auve
(74) Attorney, Agent, or Firm—Osha & May L.L.P.

(57) ABSTRACT

A method for automatically creating a corner case situation on a bus is provided. The method uses a multi-agent bus interface verification tool to create the corner case situation. Further, a method for verifying a bus interface by creating a corner case situation is provided. Further, a computer system having a multi-agent bus interface verification tool is provided. Further, a multi-agent bus interface verification software tool is provided. Further, a multi-agent bus interface verification tool that can test a bus bridge is provided. Further, a multi-agent bus interface verification tool that generates erroneous response transactions to test circuit performance is provided.

27 Claims, 6 Drawing Sheets

US 6,842,819 B2

AUTOMATIC CORNER CASE SEARCH IN MULTI-AGENT BUS INTERFACE VERIFICATION

BACKGROUND OF INVENTION

A typical computer system includes a microprocessor, memory, and peripheral computer resources, e.g., monitor, keyboard, software programs, etc. The microprocessor has, among other components, arithmetic, logic, and control circuitry that interpret and execute instructions from a computer program. FIG. 1 shows a typical microprocessor (20) that has a central processing unit (also referred to and known in the art as "CPU" or "execution unit") (22), a memory controller (also known in the art as "load/store unit") (24), and on-board, or level 1 ("L1") cache memory (26). Cache memory is a region of fast memory that holds copies of data. Further, the microprocessor (20) is connected to both a main memory (28) of the computer system and an external, or level 2 ("L2") cache memory (30).

One goal of a computer system is to efficiently and accurately execute, i.e., carry out, instructions provided by the computer system's users and computer programs. The execution of instructions is carried out by the CPU (22). Data requested by the CPU (22) to carry out an instruction are fetched by the memory controller (24) and loaded into internal registers (32) of the CPU (22). Upon command, the CPU (22) searches for the requested data in the internal registers (32). If the requested data is not available in the internal registers (32), the memory controller (24) first searches for the requested data in the on-board cache memory (26). If the requested data is not found in the on-board cache memory (26), the memory controller (24) next searches in the external cache memory (30). If this search turns out unsuccessful, the memory controller (24) retrieves the requested data from the slowest form of memory, the main memory (28).

In order for a CPU to execute instructions provided by a particular computer program, that particular computer program must have control of the CPU. Because the instructions of the computer program are carried out by the CPU, only one computer program at a time may be in control of the CPU. If an instruction belonging to a high-priority computer program requires use of the CPU, a CPU scheduler may take control of the CPU from a low-priority computer program currently using the CPU and give the control of the CPU to the high-priority program. Such a transfer of control of the CPU is typically done through the issuance of an "interrupt" notifying the CPU to stop its current process.

The transfer of control of the CPU is facilitated by an information transfer path commonly known in the art as a "bus." A bus is used to connect components of a computer system. For example, a bus may used to connect the CPU to the main memory of the computer system. This bus may also be used to allow other computer resources, such as additional CPU's, access to the main memory. In other words, in such a multiple-CPU computer system, the CPUs share an access path to the main memory.

A request for access to the main memory, or other computer system resource, is called a "transaction." A transaction is classified according to its type. For example, a transaction may be classified as a "read transaction" or "write transaction" depending on whether the transaction is a request to read data stored at a location in memory or to write data at a location in memory. As mentioned above, such transactions are facilitated by one or more buses. A computer system component connected to a bus is called an "agent." A bus interface manages allocation of resources among one or more agents that may connected to a bus.

FIG. 2 shows a typical computer system (40) having a multi-agent bus (42). The multi-agent bus (42) is connected to a first agent (44), a second agent (46), and a last agent (48). Transactions on the multi-agent bus (42) are managed by a bus interface (50). The computer system (40) also has a main memory (52) having a desired memory location (54). If the first agent (44) requests access to the desired memory location (54), the bus interface (50) gives access to the main memory (52) along the multi-agent bus (42) to the first agent (44). However, if the first agent (44) and second agent (46) request access to the desired memory location (54) at the same time, the bus interface (50), depending on priority, allows only one of the requesting agents to transact information on the multi-agent bus (42) to or from the desired memory location (54). When the bus interface (50) is called upon to handle a situation in which there are multiple requests for access to the same memory location, the situation is called as "corner case situation."

As apparent from the discussion above with reference to FIG. 2, the subject of a transaction along a bus is memory. Memory is used to store the data and instructions required to carry out various computer programs. A location in memory is called an "address." For example, a particular instruction to be executed in a computer program may be stored at a location in the memory referred to as address 1000. In such a situation, there is a strong likelihood that the next instruction to be executed resides at the next following, i.e., adjacent, address, address 1001. It follows that subsequent instructions to be executed are likely to be found at addresses 1002, 1003 . . . Likewise, data is stored in memory in a similar manner.

A computer program typically has allocated to it one or more areas in memory for storage of instructions (also referred to as "instruction space") and one or more areas in memory for storage of data (also referred to as "data space"). Moreover, input/output ("I/O") devices, e.g., disk drives, monitors, keyboards, etc., also have allocated to them one or more areas in memory (also referred to as "I/O space").

The predictability of addresses at which instructions and data reside in memory allows for improved efficiency in computer design and operation. As exemplified above, if the execution of a computer program involves a transaction that requires the access of address 1000 in memory, then there exists a strong likelihood that address locations adjacent to address 1000 are going to be accessed for the subsequent execution of the computer program. A memory cache exploits this likelihood by caching, i.e., temporarily storing, instructions and data at the adjacent locations so that the CPU has quicker access to the instructions and data. Thus, the memory cache helps enhance the efficiency of the execution of the computer program.

Although a memory cache helps improve program execution efficiency, other computer system components require improvement. In the case of a multi-agent bus, such as the one shown in FIG. 2, the design of a bus interface is challenging because the number of potential transactions on the multi-agent bus exponentially increases as the number of agents connected to multi-agent bus increases. The complexity of a multi-agent bus makes thorough testing and verification of bus design difficult due to the number of possible test cases.

SUMMARY OF INVENTION

According to one aspect of the present invention, a method for automatically creating a corner case situation on a bus comprises inputting a set of configuration parameters, selecting a transaction from a bus transaction history, and automatically creating the corner case situation by generating a response transaction corresponding to the transaction selected from the bus transaction history, where generating the response transaction is dependent on information in the set of configuration parameters.

According to another aspect, a computer system having a multi-agent bus interface verification tool that automatically creates a corner case situation comprises an integrated circuit, a memory, and a bus having at least one agent, wherein the multi-agent bus interface verification tool resides in the memory and executes instructions on the integrated circuit in order to automatically create the corner case situation on the bus.

According to another aspect, a method for verifying a bus interface comprises monitoring for at least one transaction on the bus, selecting the at least one transaction, creating a corner case situation by generating at least one response transaction on a bus, where an address associated with the at least one transaction corresponds with an address of the at least one response transaction, and verifying that the bus interface properly handles the at least one response transaction by comparing an actual result with an expected result.

According to another aspect, a software tool comprises a first portion that monitors for at least one transaction on a bus, a second portion that selects the at least one transaction, a third portion that generates at least one response transaction on the bus in response to the second portion selecting the at least one transaction, and a last portion that verifies an operation of a bus interface by comparing an actual result with an expected result in response the at least one response transaction.

According to another aspect, a method for testing a bus bridge, where the bus bridge connecting a first bus and at least one other bus, comprises inputting a set of configuration parameters, selecting a transaction from a bus transaction history, and automatically creating a corner case situation by generating a response transaction to an address corresponding to the transaction selected from the bus transaction history, wherein generating the response transaction is dependent on information in the set of configuration parameters.

According to another aspect, a method for verifying a bus bridge comprises monitoring for at least one transaction on one selected from the group consisting of a first bus and at least one other bus, selecting the at least one transaction, creating a corner case situation by generating at least one response transaction, wherein an address associated with the at least one transaction corresponds with an address of the at least one response transaction, and verifying that the bus interface properly handles the at least one response transaction by comparing an actual result with an expected result, where the bus bridge interfaces the first bus and the at least one other bus.

Other aspects and advantages of the invention will be apparent from the following description and the appended claims.

BRIEF DESCRIPTION OF THE DRAWINGS

FIG. 5b shows a flow process in accordance with the embodiment shown in FIG. 5a.

DETAILED DESCRIPTION

Embodiments of the invention relate to a method for creating a corner case situation in multi-agent bus interface verification. Further, embodiments of the present invention relate to a tool that creates a corner case situation in multi-agent bus interface verification. In addition, embodiments of the present invention relate to a method for testing a multi-agent bus interface. Further, embodiments of the present invention relate to a software tool for testing a multi-agent bus interface. In addition, embodiments of the present invention further relate to a computer system having a multi-agent bus interface verification tool.

A multi-agent bus interface verification tool generates transactions designed to verify that a bus interface capably manages transactions originating from one or more agents connected to a bus. As part of this verification process, the multi-agent bus interface verification tool creates corner case situations by taking advantage of the strong likelihood that if a certain address in memory is the subject of a transaction, then adjacent addresses are likely to be the subjects of future transactions. By assessing the behavior of a bus interface in response to the creation of corner case situations, bus interface design may be verified by comparing an actual result with an expected result. Further, the multi-agent bus interface verification tool monitors a record of bus transactions by agents connected to the bus.

Figure 1:
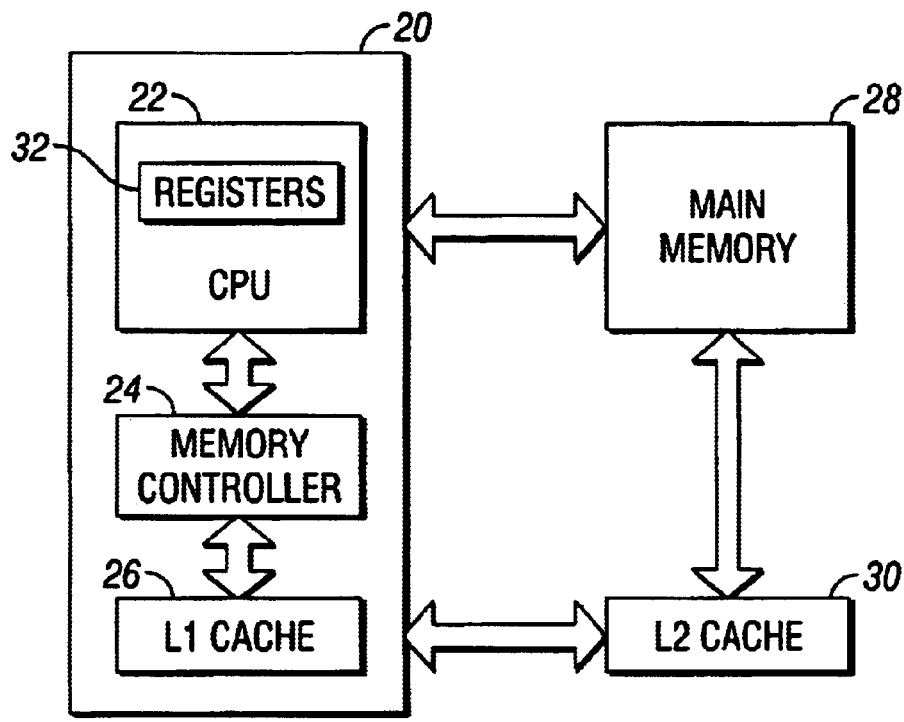
FIG. 1 shows a typical computer system.
Figure 2:
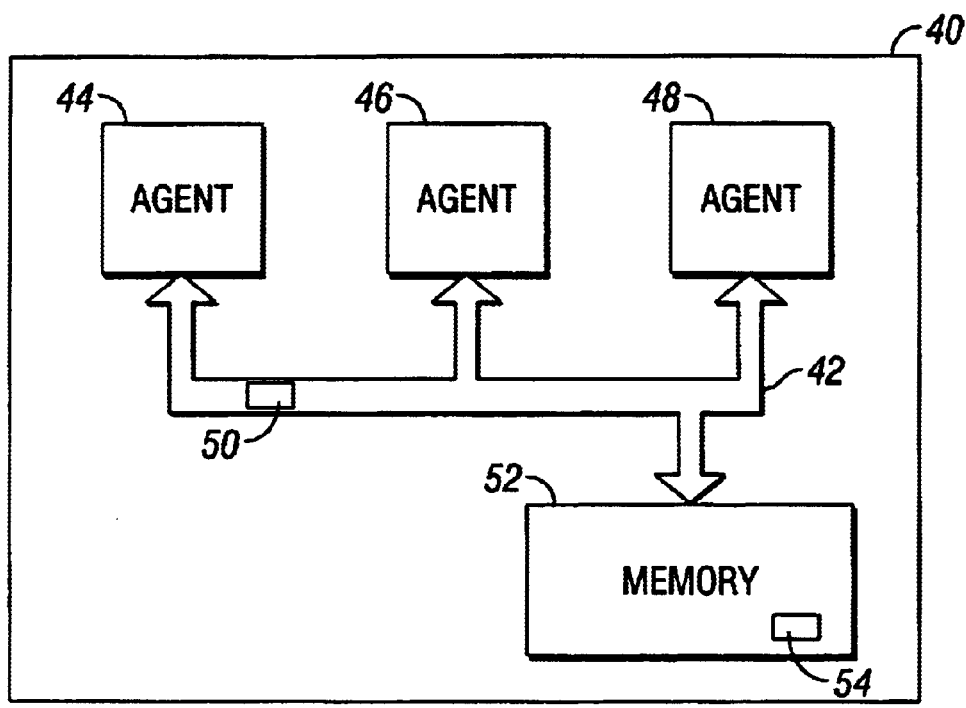
FIG. 2 shows a typical multi-agent bus.
Figure 3:
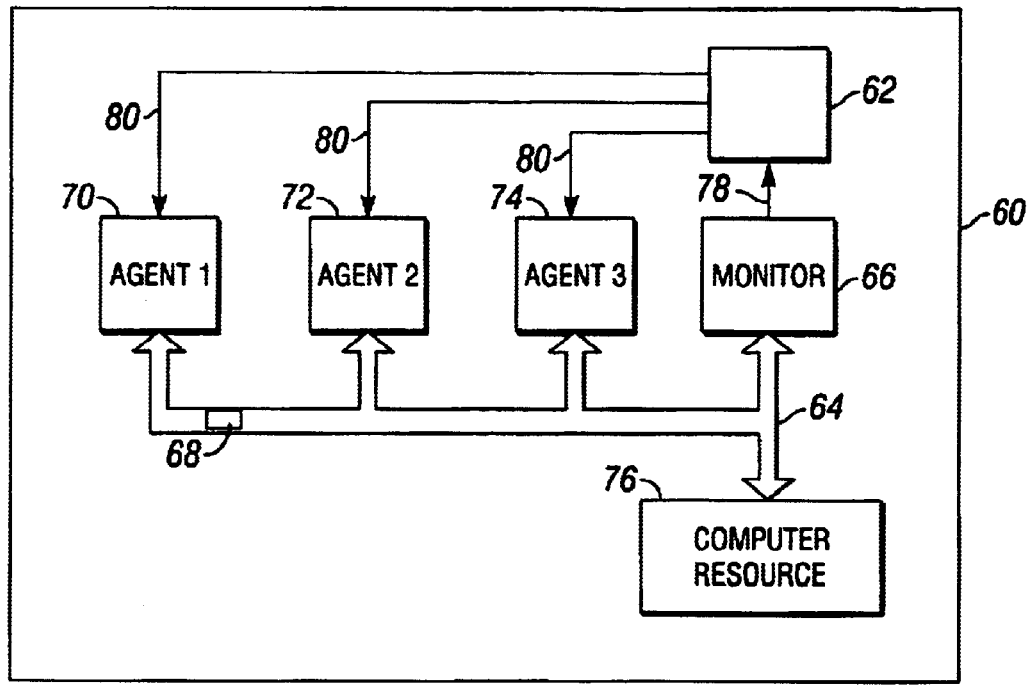
FIG. 3 shows a computer system in accordance with an embodiment of the present invention.

FIG. 3 shows an exemplary computer system (60) in accordance with an embodiment of the present invention. The computer system (60) has a multi-agent bus interface verification tool (62), a bus (64), a bus monitor (66), a bus interface (68), a first bus agent (70), a second bus agent (72), a nth bus agent (74), and a computer resource (76). The bus monitor (66) reports bus transaction history (78) on the bus (64) to the multi-agent bus interface verification tool (62). In response to certain information provided by the bus monitor (66), the multi-agent bus interface verification tool (62) generates response transactions by selectively sending commands (80) to the bus agents (70, 72, 74). In turn, one or more of the bus agents (70, 72, 74) conduct transactions on the bus (68) according to the commands sent (80) by the multi-agent bus interface verification tool (62).

The multi-agent bus interface verification tool (62) is configured so that response transactions do not change information stored in the computer resource (76). Thus, those skilled in the art will appreciate that the multi-agent bus interface verification tool (62) operates in a non-destructive manner with respect to information stored in the computer resource (76).

Figure 4:
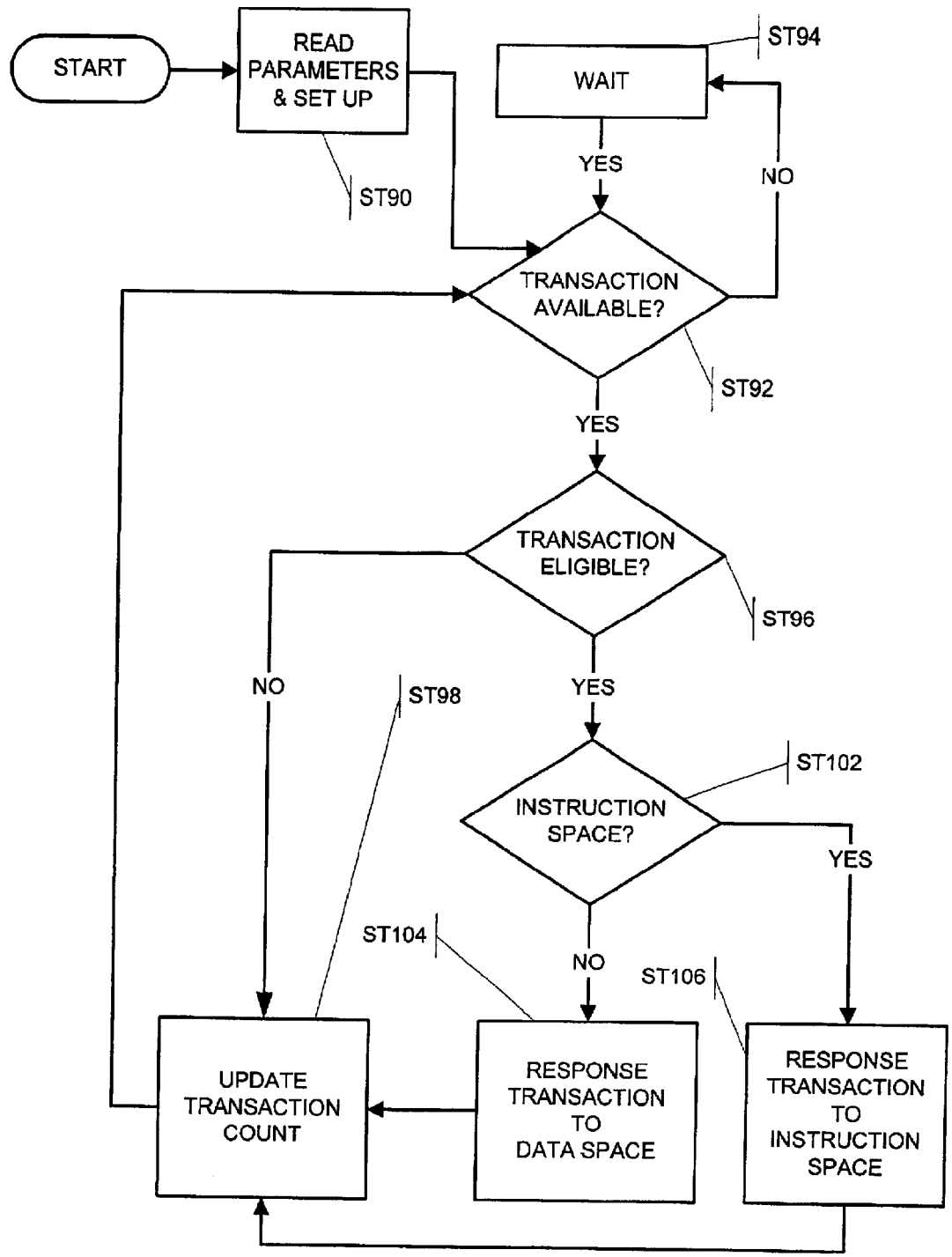
FIG. 4 shows a flow process in accordance with an embodiment of the present invention.

FIG. 4 shows an exemplary flow process in accordance with an embodiment of the present invention. A multi-agent bus interface verification tool accesses information passed to it from both a computer system in which the multi-agent bus interface verification tool resides and from one or more configuration files from which configuration parameters are read (step 90). Such information may include memory size, processor speed, bus speed, etc. Further, those skilled in the art will appreciate that the configuration parameters may be used to allow the multi-agent bus interface verification tool to set up different modes of operation for enhanced flexibility in diagnostic testing situations and/or to adapt to the varying environments of different computer systems.

The multi-agent bus interface verification tool uses one or more configuration parameters to create a memory map of the computer system. The memory map delineates one or more areas of memory in the computer system. The memory map may be defined by addresses. For example, a memory map may have a lower boundary set at an address of 1000 and an upper boundary set at an address of 2000.

The memory map allows the multi-agent bus interface verification tool to determine which transactions from a bus transaction history are eligible to generate response transactions by the multi-agent bus interface verification tool. A transaction associated with a memory address that is not within the memory map is deemed ineligible for response transactions by the multi-agent bus interface verification tool. For example, when a bus agent reads data from an address 900 in memory, the transaction is reported to the multi-agent bus interface verification tool via a bus monitor, where after the multi-agent bus interface verification tool makes a determination as to whether the transaction is eligible depending on whether address 900 is within the multi-agent bus interface verification tool's memory map. Continuing with the same example, if the memory map is bounded between addresses 1000 and 2000, then the transaction is ineligible for purposes of generating a response transaction. Moreover, addresses classified as non-cacheable, when associated with a transaction, are also rendered ineligible for purposes of generating a response transaction.

Still referring to the exemplary flow process shown in FIG. 4, the multi-agent bus interface verification tool determines whether a transaction is available (step 92). Those skilled in the art will appreciate that information relating to transactions that have occurred on a bus within a certain amount of time may be available to the multi-agent bus interface verification tool through a bus history queue. The bus history queue may contain information such as a memory address associated with a particular transaction. Moreover, the bus history queue may be maintained through the use of a data structure.

If there is no transaction available, the multi-agent bus interface verification tool waits until either a transaction becomes available or a user intervenes (step 94). If a transaction is available or once a transaction becomes available, the multi-agent bus interface verification tool selects the transaction in the bus history queue and evaluates the transaction to determine whether the transaction is eligible for purposes of generating a response transaction (step 96).

If the memory address with the transaction is not within the multi-agent bus interface verification tool's memory map, the transaction is deemed ineligible for purposes of generating a response transaction, and a transaction count is updated (step 98), where after the multi-agent bus interface verification tool returns to determining whether another transaction is or has become available (step 92).

Otherwise, if the transaction is eligible, then a determination is made as to whether the address associated with the transaction is associated with instruction space (step 102). If the address associated with the transaction is associated with instruction space, then a response transaction from the multi-agent bus interface verification tool is generated to a particular area of memory associated with instruction space (step 104). Because it is likely that subsequent transactions are going to be associated with addresses adjacent to the address associated with the current transaction, the multi-agent bus interface verification tool may generate one or more response transactions to the adjacent addresses in order to produce corner case situations.

If, however, the address associated with the transaction is not associated with instruction space and is instead associated with data space, a response transaction is generated to a particular area of memory associated with data space (step 106). Because it is likely that subsequent transactions are going to be associated with addresses adjacent to the address associated with the current transaction, the multi-agent bus interface verification tool may generate one or more response transactions to the adjacent addresses in order to produce corner case situations. Further, those skilled in the art will appreciate that in other embodiments, the multi-agent bus interface verification tool may first make a determination as to whether the address associated with the transaction is associated with data space.

After generating a response transaction to either instruction space (step 104) or data space (step 106), the multi-agent bus interface verification tool updates the transaction count (step 98) and returns to determining whether another transaction is or has become available (step 100).

Figure 5A:
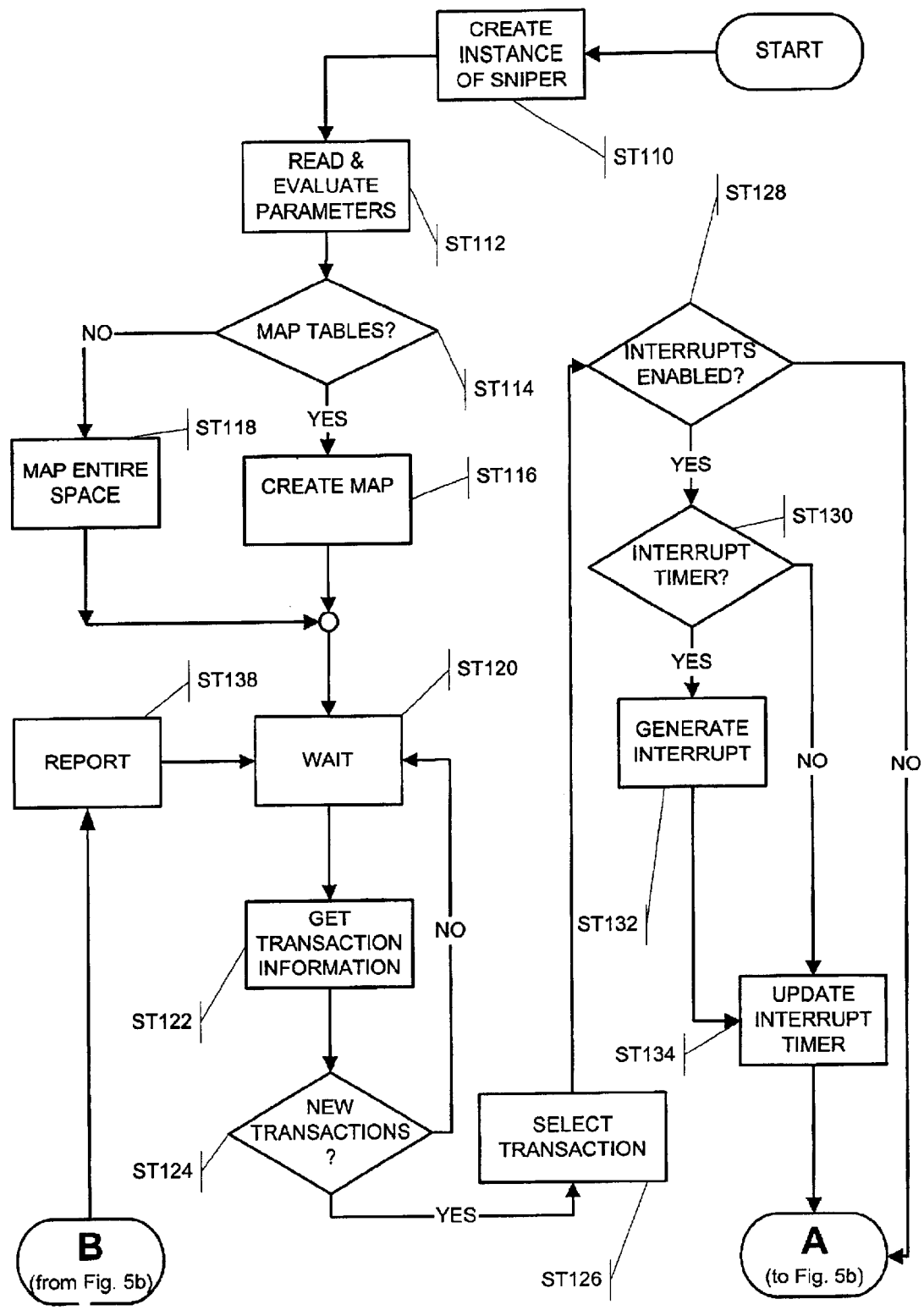
FIG. 5a shows a flow process in accordance with an embodiment of the present invention.
Figure 5B:
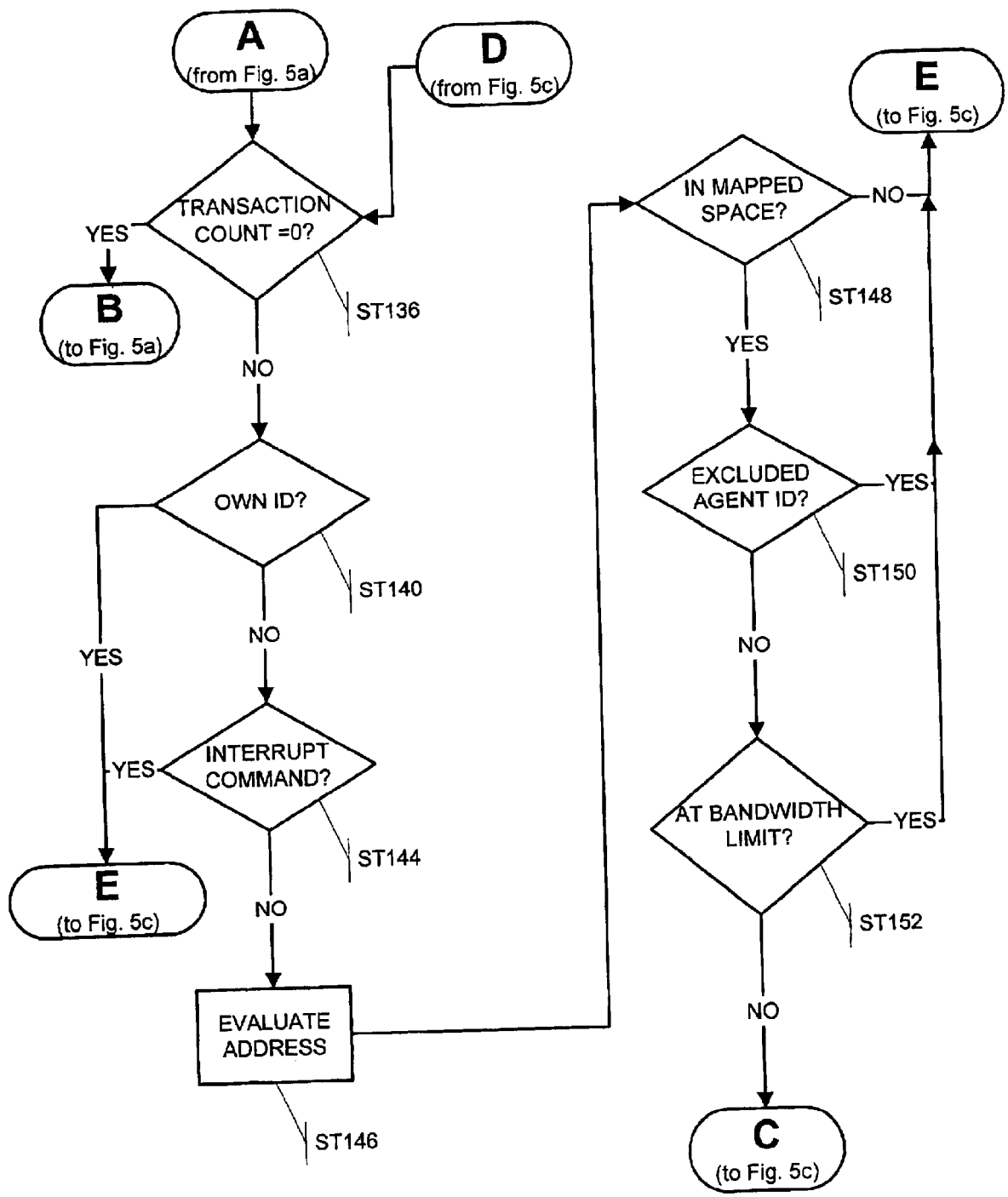
Figure 5C:
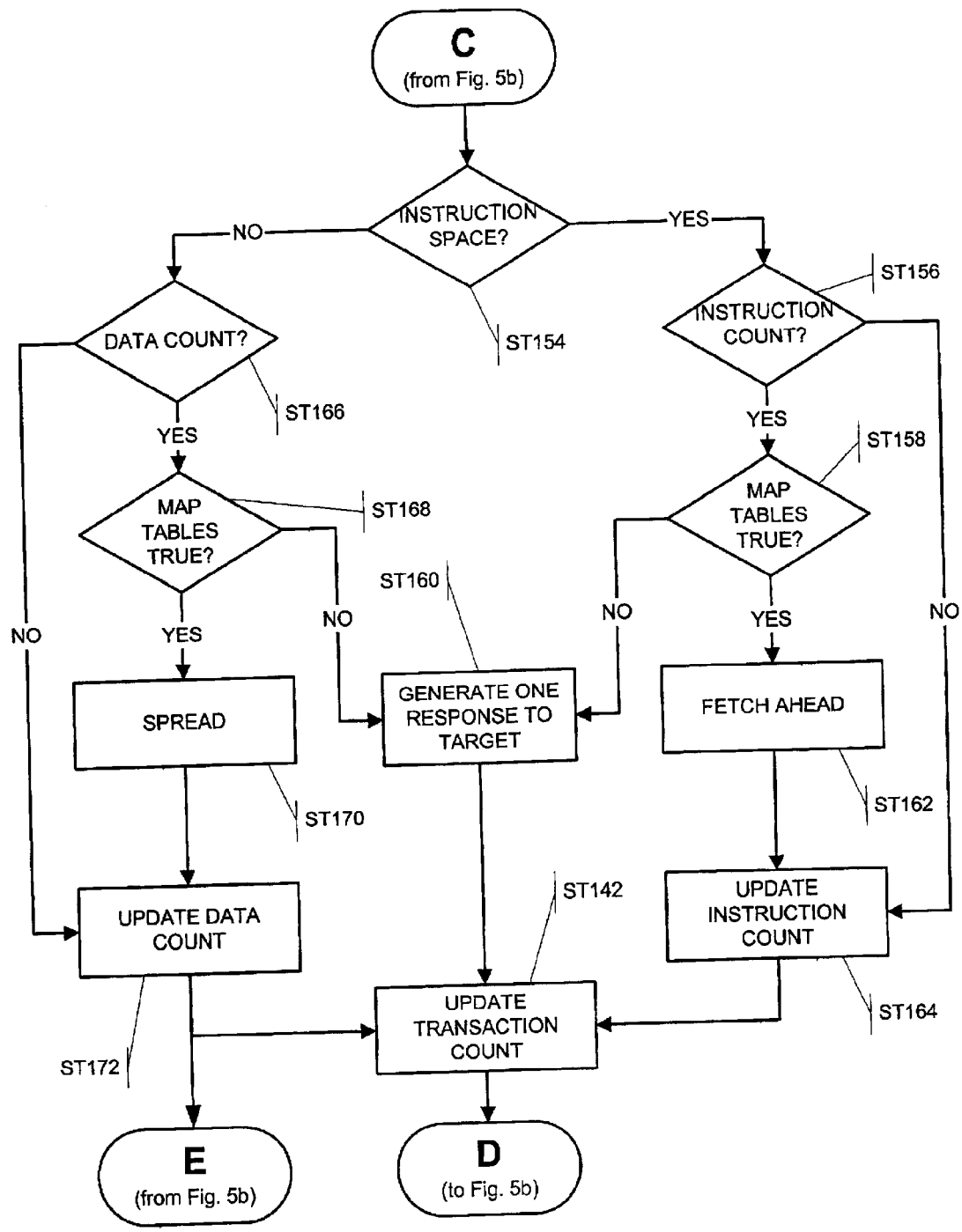
FIG. 5c shows a flow process in accordance with the embodiments shown in FIGS. 5a and 5b.

Showing additional functionality of the present invention, FIGS. 5a, 5b, and 5c show an exemplary flow process in accordance with an embodiment of the present invention. Referring first to FIG. 5a, an instance of a multi-agent bus interface verification tool is created and assigned an identification number (step 110). Information required for creating the instance of the multi-agent bus interface verification tool may be passed to the multi-agent bus interface verification tool via command line arguments, input files, etc.

Next, one or more configuration parameters are read and evaluated from one or more configuration files (step 112). One particular configuration parameter, referred to as "MAP_TABLES," functions as a signal to the multi-agent bus interface verification tool regarding the particular environment in which the multi-agent bus interface verification tool is operating. A value of MAP_TABLES indicates to the multi-agent bus interface verification tool whether to establish a memory map based on information from a file specifying one or more ranges of memory addresses that are cacheable. Those skilled in the art will appreciate that the MAP_TABLES configuration parameter affords the multi-agent bus interface verification tool an ability to adapt to various computer system environments.

A determination is made as to whether MAP_TABLES indicates to the multi-agent bus interface verification tool how a memory map should be created (step 114). If MAP_TABLES indicates to the multi-agent bus interface verification tool that a file should be used, a memory map is created based on information contained in the file (step 116). However, if MAP_TABLES indicates otherwise, a memory map of the entire address space of the computer system's memory is created (step 118). Those skilled in the art will appreciate that in this case, response transactions generated by the multi-agent bus interface verification tool may be purposefully restricted so as to adapt to varying operating conditions and environments.

Another configuration parameter, referred to as "SNIPER_CYCLES," allows control of multi-agent bus interface verification tool bandwidth (the number of response transactions generated by the multi-agent bus interface verification tool over a period of time). For example, in order to configure the multi-agent bus interface verification tool so that it generates fewer response transactions per unit of time, the value of SNIPER_CYCLES may be adjusted.

Depending on the value of SNIPER_CYCLES, the multi-agent bus interface verification tool waits a certain amount of time (step 120).

Next, the multi-agent bus interface verification tool obtains transaction information from a bus history queue (step 122). The multi-agent bus interface verification tool then determines whether a new transaction is available in the bus history queue (step 124). If a new transaction is available, the multi-agent bus interface verification tool selects the transaction from the bus history queue (step 126). Otherwise, if there is no new transaction available, the multi-agent bus interface verification tool returns to waiting a certain amount of time (step 120).

After the multi-agent bus interface verification tool selects a new transaction from the bus history queue (step 126), a determination is made as to whether interrupts are enabled (step 128). If interrupts are enabled, the multi-agent bus interface verification tool determines whether there is an interrupt timer (step 130). If there is an interrupt timer, the multi-agent bus interface verification tool issues an interrupt (step 132), where after an interrupt timer is updated (step 134). Otherwise, if there is no interrupt timer, no interrupt is issued, and the interrupt time is updated (step 134).

Now referring to FIG. 5*b*, the multi-agent bus interface verification tool determines whether a value of a transaction count is equal to zero (step 136). The value of the transaction count is derived from the number of items in the bus history queue. If the value of the transaction count is equal to zero, then, as shown in FIG. 5*a*, a report is generated (step 138), where after the multi-agent bus interface verification tool returns to waiting a certain amount of time (step 120).

Otherwise, if the value of the transaction count is not equal to zero, then, as shown in FIG. 5*b*, the multi-agent bus interface verification tool determines whether the transaction is associated with the identification number assigned to the multi-agent bus interface verification tool (step 140), in which case, the multi-agent bus interface verification tool does not generate a response transaction, and instead updates the value of the transaction count (shown in FIG. 5*c* as step 142), where after the multi-agent bus interface verification tool returns to determining whether the value of transaction count is equal to zero (step 136).

If, however, the transaction is not associated with the multi-agent bus interface verification tool's identification number, then, as shown in FIG. 5*b*, the multi-agent bus interface verification tool determines whether the transaction is associated with an interrupt (step 144). If the transaction is associated with an interrupt, the multi-agent bus interface verification tool does not generate a response transaction, and instead updates the value of the transaction count (shown in FIG. 5*c* as step 142), where after the multi-agent bus interface verification tool returns to determining whether the value of transaction is equal to zero (step 136). Otherwise, if the transaction is not associated with an interrupt, then, as shown in FIG. 5*b*, the multi-agent bus interface verification tool evaluates the address associated with the transaction (step 146).

In this evaluation process, the multi-agent bus interface verification tool determines whether the address associated with the transaction is within a range of addresses included in the memory map (step 148). If the address associated with the transaction is not within any range of addresses included in the memory map, then the transaction is ineligible for purposes of generating a response transaction, where after the multi-agent bus interface verification tool does not generate a response transaction and instead updates the value of the transaction count (shown in FIG. 5*c* as step 142) and returns to determining whether the value of the transaction count is equal to zero (step 136).

If, however, the address associated with the transaction is within a range of addresses included in the memory map, then, as shown in FIG. 5*b*, the multi-agent bus interface verification tool determines whether the transaction is associated with an excluded agent, i.e., an agent on the bus for which the multi-agent bus interface verification tool does not generate response transactions (step 150). If the transaction, via its address, is associated with an excluded agent, the multi-agent bus interface verification tool does not generate a response transaction and instead updates the value of the transaction count (shown in FIG. 5*c* as step 142) and returns to determining whether the value of the transaction count is equal to zero (step 136).

Otherwise, if the transaction is not associated with an excluded agent, the multi-agent bus interface verification tool determines whether generating a response transaction would cause the multi-agent bus interface verification tool to exceed a bandwidth limit (step 152). Recall from above that the bandwidth limit constrains the number of multi-agent bus interface verification tool response transactions generated over a period of time. If generating a response transaction would cause the multi-agent bus interface verification tool to exceed the bandwidth limit, the multi-agent bus interface verification tool updates the value of the transaction count (step 142) and returns to determining whether the value of the transaction count is equal to zero (step 136). However, if generating a response transaction would not cause the multi-agent bus interface verification tool to exceed the bandwidth limit, the transaction is eligible for a response transaction from the multi-agent bus interface verification tool, where after the transaction may be referred to as a "target."

Once a target is established, the multi-agent bus interface verification tool determines whether the target is associated with instruction space (step 154). If the target is associated with instruction space, the multi-agent bus interface verification tool proceeds to determine a value of a particular configuration parameter referred to as "INSTRUCTION_COUNT" (step 156). INSTRUCTION_COUNT is set in order to limit the number of response transactions generated by the multi-agent bus interface verification tool to instruction space. If the determination of the value of INSTRUCTION_COUNT results in a 'false' value, the multi-agent bus interface verification tool updates the value of INSTRUCTION_COUNT (step 164), where after the value of the transaction count is updated (step 142) and the multi-agent bus interface verification tool returns to determining whether the value of the transaction count is equal to zero (shown in FIG. 5*b* as step 136). If the determination of the value of INSTRUCTION_COUNT results in a 'true' value, a determination is made as to the value of MAP_TABLES (step 158). Those skilled in the art will appreciate that the value of INSTRUCTION_COUNT is adjustable, thereby enabling the multi-agent bus interface verification tool to adapt to varying computer system environments.

If the determination of the value of MAP_TABLES results in a 'false' value, one response transaction is generated, where this response transaction has an address equal to the address associated with the target (step 160). However, if the determination of the value of MAP_TABLES results in a 'true' value, the multi-agent bus interface verification tool executes a function referred to as "FETCH_AHEAD" (step 162). The FETCH_AHEAD function generates a response transaction directed at instruction space. The FETCH_AHEAD function anticipates possible future transactions on the bus by other agents and thereby creates a corner case situation. Moreover, the address associated with the response transaction is offset from the address associated with the target by an amount determined by a configuration parameter. For example, if the target is associated with address 1000, the FETCH_AHEAD function generates a response transaction associated with address 1002. After the FETCH_AHEAD function executes, the value of INSTRUCTION_COUNT is updated (step 158), where after the value of the transaction count is updated (step 142) and the multi-agent bus interface verification tool returns to determining whether the value of transaction count is equal to zero (shown in FIG. 5b as step 136). Those skilled in the art will appreciate that the FETCH_AHEAD function or equivalents thereof may generate any number of response transactions.

Referring back to step 154 (shown in FIG. 5c), if the target is not associated with instruction space, the multi-agent bus interface verification tool proceeds to determine a value of a particular configuration parameter referred to as "DATA_COUNT" (step 166). DATA_COUNT is set to limit the number of response transactions generated by the multi-agent bus interface verification tool to data space. If the determination of the value of DATA_COUNT results in a 'false' value, the value of DATA_COUNT is updated (step 172), and the multi-agent bus interface verification tool proceeds to updating the value of the transaction count (step 142) and returns to determining whether the value of the transaction count is equal to zero (shown in FIG. 5b as step 136). However, if the determination of the value of DATA_COUNT results in a 'true' value, a determination is made as to the value of MAP_TABLES (step 168).

If the determination of the value of MAP_TABLES results in a 'false' value, one response transaction is generated, where this response transaction has an address equal to the address associated with the target (step 160). However, if the determination of the value of MAP_TABLES results in a 'true' value, the multi-agent bus interface verification tool executes a function referred to as "SPREAD" (step 170).

The SPREAD function involves, for example, generating three random response transactions out of four possible response types of response transactions. The four possible types are (1) a "READ" operation, which may be executed after some delay if delays are enabled, (2) an "OWN_DELAY" operation, which may be executed after some delay if delays are enabled, (3) an "OWN_NO_DELAY" operation, executed with no delay, and (4) a "READ_BLOCK" operation, which may be executed after some delay if delays are enabled. Specifically, a READ_BLOCK operation reads a group of contiguous addresses in memory. Those skilled in the art will appreciate that the SPREAD function or equivalents thereof may generate any number of response transactions.

One of the three generated response transactions is directed at the address associated with the target, while the other two generated response transactions are directed at addresses adjacent to the address associated with the target. For example, if the address associated with the target is address 1000, the multi-agent bus interface verification tool generates one response transaction associated with address 1000 and another two response transactions associated with addresses offset by a certain offset value above and below the address associated with the target, e.g., addresses 997 and 1003. The offset value is determined by a configuration parameter. The SPREAD function verifies that the addresses of the two outer transactions are associated addresses in a range included in the memory map. The SPREAD function anticipates possible future transactions on the bus by other agents and then generates response transactions accordingly so as to create a corner case situation. After the SPREAD function completes execution, the value of DATA_COUNT is updated (step 172), where after the multi-agent bus interface verification tool proceeds to updating the value of the transaction count (step 142) and then returns to determining whether the value of the transaction count is equal to zero (shown in FIG. 5b as step 136). Those skilled in the art will appreciate that the value of DATA_COUNT is adjustable, thereby enabling the multi-agent bus interface verification tool to adapt to varying computer system environments.

Figure 6:
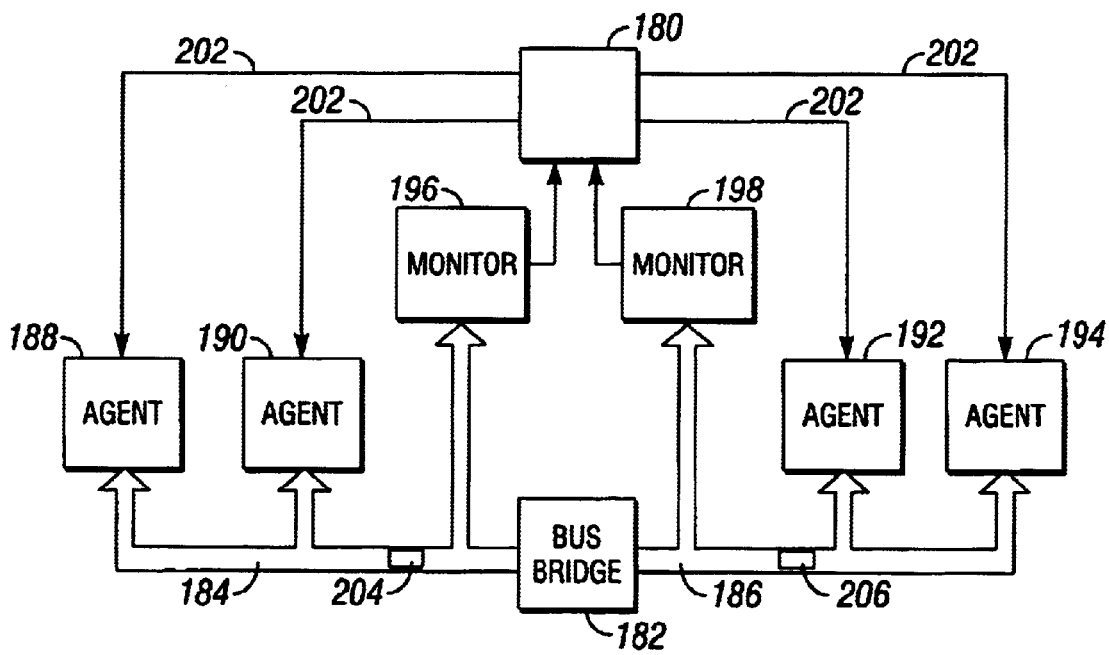
FIG. 6 shows a computer system in accordance with another embodiment of the present invention.

Now referring to FIG. 6, a multi-agent bus interface verification tool (180) that is capable of testing a bus bridge (182) is shown in accordance with an embodiment of the present invention. A bus bridge is a device that connects two or more buses, such as data buses, address buses, etc. In FIG. 6, the bus bridge (182) interfaces a first bus (184) and a second bus (186). Each bus (184, 186) is connected to one or more bus agents (188, 190, 192, 194), respectively. Each bus (184, 186) is also connected to a respective bus monitor (196, 198). The bus monitors (196, 198) reports bus transaction history on the first and second buses (184, 186), respectively, to a multi-agent bus interface verification tool (200). In response to certain information provided by the bus monitors (196, 198), the multi-agent bus interface verification tool (180) generates response transactions by selectively sending commands (202) to the various bus agents (188, 190, 192, 194). In turn, one or more of the bus agents (188, 190, 192, 194) conduct transactions on the first and second buses (184, 186) according to the commands sent (202) by the multi-agent bus interface verification tool (180). Effectively, the multi-agent bus interface verification tool (180) can stress, i.e., verify or test, one or more bus interfaces (204, 206) on the first and second buses (184, 186).

Those skilled in the art will appreciate that the multi-agent bus interface verification tool (200) may detect a transaction which originates from one of the buses (184, 186) and is associated with an address in another bus. When the multi-agent bus interface verification tool (200) detects the transaction, the multi-agent bus interface verification tool (200) may attempt to cause corner case situations by generating response transactions as discussed above with references to FIGS. 5a, 5b, and 5c. Further, those skilled in the art will appreciate that although the embodiment shown in FIG. 6 illustrates two buses connected to the test bridge, the multi-agent bus interface verification tool may be used to test any number of buses connected to any number of bus bridges.

In an alternative embodiment, a multi-agent bus interface verification tool may be used to test a computer system by generating one or more erroneous response transactions. This allows a designer to monitor how the computer system recovers when an error is manifested. An example of the type of error that may be generated includes, but is not limited to, parity errors.

Advantages of the present invention may include one or more of the following. In some embodiments, a multi-agent bus interface verification tool facilitates improved bus interface verification by interacting with a bus transaction history and automatically generating situations likely to stress the bus interface.

In some embodiments, because a multi-agent bus interface verification tool automatically generates a corner case situation on a bus, bus interface performance and efficiency may be verified and improved. Such verification of the bus interface may be achieved by comparing an actual result with an expected result.

In some embodiments, because a multi-agent bus interface verification tool automatically may generate an error response transaction, recovery performance of a computer system components may be tested.

In some embodiments, because a multi-agent bus interface verification tool operates in a non-destructive manner, one or more memory addresses may be accessed but not altered.

In some embodiments, because a multi-agent bus interface verification tool automatically generates one or more response transactions on a bus, a bus bridge may be tested.

In some embodiments, because bus interface tests are dynamic through the use of a multi-agent bus interface verification tool, exhaustive pre-operation tests do not need to be performed.

In some embodiments, because a multi-agent bus interface verification tool operates based on configuration parameters provided by a computer user or program, the multi-agent bus interface verification tool may be used in various computer system environments.

In some embodiments, because a multi-agent bus interface verification tool helps improve bus transaction efficiency and accuracy, overall computer system performance is improved.

In some embodiments, because a multi-agent bus interface verification tool helps test a computer system and associated devices for the ability to recover from erroneous transactions, overall computer system performance is improved.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automatically creating a corner case situation on a bus, comprising:
    inputting a set of configuration parameters;
    selecting a transaction from a bus transaction history; and
    automatically creating the corner case situation by generating a response transaction to an address corresponding to the transaction selected from the bus transaction history, wherein generating the response transaction is dependent on information in the set of configuration parameters.

2. The method of claim 1, wherein the bus transaction history comprises at least one completed transaction on the bus.

3. The method of claim 1, wherein the response transaction is an erroneous response transaction.

4. The method of claim 1, further comprising:
    creating a memory map based on information in the set of configuration parameters, wherein the memory map represents at least one range of addresses in memory to which the response transaction is generated.

5. The method of claim 4, wherein automatically creating the corner case situation comprises:
    determining whether the transaction is eligible based on the memory map;
    determining whether the transaction is associated with an address associated with instruction space if the transaction is eligible; and
    generating the response transaction to the instruction space depending on the determining whether the transaction is associated with an address associated with instruction space if the transaction is eligible.

6. The method of claim 5, further comprising:
    establishing a target, wherein an address associated with the target corresponds to an address of the transaction;
    determining whether the memory map represents at least one range of addresses in memory specified by information in the set of configuration parameters; and
    selectively generating the response transaction to an address that is offset from the address associated with the target, wherein selectively generating the response transaction is dependent on the determining whether the memory map represents at least one range of addresses in memory specified by information in the set of configuration parameters.

7. The method of claim 4, wherein automatically creating the corner case situation comprises:
    determining whether the transaction is eligible based on the memory map;
    determining whether the transaction is associated with an address associated with data space if the transaction is eligible; and
    generating the response transaction to the data space depending on the determining whether the transaction is associated with an address associated with data space if the transaction is eligible.

8. The method of claim 7, further comprising:
    establishing a target, wherein an address associated with the target corresponds to an address of the transaction;
    determining whether the memory map represents at least one range of addresses in memory specified by information in the set of configuration parameters; and
    executing at least one response transaction selected from the group consisting of a read response transaction, an own-delay response transaction, an own-no-delay response transaction, and a read block response transaction, wherein executing the at least one response transaction is dependent on the determining whether the memory man represents at least one range of addresses in memory specified by information in the set of configuration parameters;
    wherein an address associated with the at least one response transaction corresponds to the address associated with the target.

9. A method for verifying a bus interface, comprising:
    monitoring for at least one transaction on a bus;
    selecting the at least one transaction;
    creating a corner case situation by generating at least one response transaction on the bus, wherein an address associated with the at least one transaction corresponds with an address of the at least one response transaction; and
    verifying that the bus interface properly handles the at least one response transaction by comparing an actual result with an expected result.

10. The method of claim 9, wherein creating the corner situation comprises:

determining whether the address associated with the at least one transaction is within a range of addresses in a memory map;

determining whether the address associated with the at least one transaction is in an instruction space if the address associated with the at least one transaction is within the range of addresses in the memory map; and creating the corner case situation by generating the at least one response transaction such that the address associated with the at least one response transaction is selectively offset from the address associated with the at least one transaction.

11. The method of claim 9, wherein creating the corner case situation comprises:

determining whether the address associated with the at least one transaction is within a range of addresses in a memory map;

determining whether the address associated with the at least one transaction is in a data space if the address associated with the at least one transaction is within the range of addresses in the memory map; and creating the corner case situation by generating the at least one response transaction; and generating another response transaction;

wherein the address associated with the at least one response transaction corresponds to the address associated with the at least one transaction, and wherein an address associated with the another response transaction is selectively offset from the address associated with the at least one transaction.

12. The method of claim 11, wherein the at least one response transaction is selected from the group consisting of a read response transaction, an own-delay response transaction, an own-no-delay response transaction, and a read block transaction.

13. The method of claim 11, wherein the another response transaction is not identical to the at least one response transaction.

14. A computer system having a multi-agent bus interface verification tool that automatically creates a corner case situation, comprising:

an integrated circuit;

a memory;

a bus having at least one agent; and a bus interface, wherein the multi-agent bus interface verification tool resides in the memory and executes instructions on the integrated circuit in order to automatically create the corner case situation on the bus, wherein the corner case situation tests the bus interface, and wherein the corner case situation is created when the multi-agent bus interface verification tool generates at least one response transaction on the bus.

15. The computer system of claim 14, wherein the multi-agent bus interface verification tool generates the at least one response transaction on the bus via the at least one agent.

16. A computer-readable medium having recorded thereon instructions executable by a processor, the instructions adapted to:

monitor at least one transaction on a bus;

select the at least one transaction;

create a corner case situation by generating at least one response transaction on the bus in response to selecting the at least one transaction, wherein an address associated with the at least one transaction corresponds with an address of the at least one response transaction; and verify an operation of a bus interface by comparing an actual result with an expected result in response the at least one response transaction.

17. A method for testing a bus bridge, the bus bridge connecting a first bus and at least one other bus, comprising:

inputting a set of configuration parameters;

selecting a transaction from a bus transaction history; and automatically creating a corner case situation by generating a response transaction to an address corresponding to the transaction selected from the bus transaction history, wherein generating the response transaction is dependent on information in the set of configuration parameters.

18. The method of claim 17, wherein the bus transaction history comprises at least one selected from the group consisting of a completed transaction on the first bus and a completed transaction on the at least one other bus.

19. The method of claim 17, further comprising:

creating a memory map based on information in the set of configuration parameters, wherein the memory map represents at least one range of addresses in memory to which the response transaction is generated.

20. The method of claim 19, wherein automatically creating the corner case situation comprises:

determining whether the transaction is eligible based on the memory map;

determining whether the transaction is associated with an address associated with instruction space if the transaction is eligible; and generating the response transaction to the instruction space depending on the determining whether the transaction is associated with an address associated with instruction space if the transaction is eligible.

21. The method of claim 20, further comprising:

establishing a target, wherein an address associated with the target corresponds to an address of the transaction;

determining whether the memory map represents at least one range of addresses in memory specified by information in the set of configuration parameters; and selectively generating the response transaction to an address that is offset from the address associated with the target, wherein selectively generating the response transaction is dependent on the determining whether the memory map represents at least one range of addresses in memory specified by information in the set of configuration parameters.

22. The method of claim 19, wherein automatically creating the corner case situation comprises:

determining whether the transaction is eligible based on the memory map;

determining whether the transaction is associated with an address associated with data space if the transaction is eligible; and generating the response transaction to the data space depending on the determining whether the transaction is eligible based on the memory man and whether the transaction is associated with an address associated with data space if the transaction is eligible.

23. The method of claim 22, further comprising:

establishing a target, wherein an address associated with the target corresponds to an address of the transaction;

determining whether the memory map represents at least one range of addresses in memory specified by information in the set of configuration parameters; and executing at least one response transaction selected from the group consisting of a read response transaction, an own-delay response transaction, an own-no-delay response transaction, and a read block response transaction, wherein executing the at least one response transaction is dependent on the determining whether the memory man represents at least one range of addresses in memory specified by information in the set of configuration parameters;

wherein an address associated with the at least one response transaction corresponds to the address associated with the target.

24. A method for verifying a bus bridge, comprising:

monitoring for at least one transaction on one selected from the group consisting of a first bus and at least one other bus;

selecting the at least one transaction;

creating a corner case situation by generating at least one response transaction, wherein an address associated with the at least one transaction corresponds with an address of the at least one response transaction; and verifying that the bus bridge properly handles the at least one response transaction by comparing an actual result with an expected result, wherein the bus bridge interfaces the first bus and the at least one other bus.

25. The method of claim 24, wherein creating the corner situation comprises:

determining whether the address associated with the at least one transaction is within a range of addresses in a memory map;

determining whether the address associated with the at least one transaction is in an instruction space if the address associated with the at least one transaction is within the range of addresses in the memory map; and creating the corner case situation by generating the at least one response transaction such that the address associated with the at least one response transaction is selectively offset from the address associated with the at least one transaction.

26. The method of claim 25, wherein the at least one response transaction is selected from the group consisting of a read response transaction, an own-delay response transaction, an own-no-delay response transaction, and a read block transaction.

27. The method of claim 24, wherein creating the corner case situation comprises:

determining whether the address associated with the at least one transaction is within a range of addresses in a memory map;

determining whether the address associated with the at least one transaction is in a data space if the address associated with the at least one transaction is within the range of addresses in the memory map; and creating the corner case situation by generating the at least one response transaction; and generating another response transaction;

wherein the address associated with the at least one response transaction corresponds to the address associated with the at least one transaction, and wherein an address associated with the another response transaction is selectively offset from the address associated with the at least one transaction.

* * * * *